United States Patent [19]

Käser

[11] Patent Number: 5,383,022

[45] Date of Patent: Jan. 17, 1995

[54] METHOD AND APPARATUS FOR MEASURING THE DIMENSIONS OF AN OBJECT

[75] Inventor: Beda Käser, Brügg, Switzerland

[73] Assignee: Zumbach Electronic AG, Orpund, Switzerland

[21] Appl. No.: 44,571

[22] Filed: Apr. 6, 1993

[30] Foreign Application Priority Data

Apr. 10, 1992 [CH] Switzerland ............. 01189/92

[51] Int. Cl.$^6$ ............................................. G01B 11/08
[52] U.S. Cl. ................................. 356/387; 250/560
[58] Field of Search .............. 356/372, 384, 385, 386, 356/387; 250/560

[56] References Cited

U.S. PATENT DOCUMENTS

| | | | |
|---|---|---|---|
| 3,870,890 | 3/1975 | Binks et al. | 356/387 |
| 4,432,648 | 2/1984 | Musto et al. | 356/387 |
| 4,444,457 | 4/1984 | Studer | 356/387 |
| 4,880,991 | 11/1989 | Boehnlein et al. | 250/560 |
| 5,212,539 | 5/1993 | Wögerbauer | 356/384 |

FOREIGN PATENT DOCUMENTS

| | | |
|---|---|---|
| 0244163 | 11/1987 | European Pat. Off. . |
| 3520759 | 8/1986 | Germany . |
| 59-203904 | 11/1984 | Japan ............... 356/386 |

Primary Examiner—F. L. Evans
Attorney, Agent, or Firm—Spencer, Frank & Schneider

[57] ABSTRACT

Laser beams from separate sources are deflected by a rotating mirror and travel over further mirrors and objective lenses into a measuring field for measuring the dimensions of an object 3 in the x and y directions. The result is a simple, compact configuration. The separate optical systems for both measuring directions can be set in an optimum manner independently of one another, permitting great precision. Thanks to an offset of the optical axis of the incident laser beams relative to the rotation axis of the mirror the measurements in the two directions are made staggered in time so that the measurement signals can be processed in a common measuring channel.

17 Claims, 3 Drawing Sheets

METHOD AND APPARATUS FOR MEASURING THE DIMENSIONS OF AN OBJECT

CROSS REFERENCE TO RELATED APPLICATION

This application claims the priority of application Ser. No. 01-189/92-6, filed Apr. 10, 1992, in Switzerland, the subject matter of which is incorporated herein by reference.

BACKGROUND OF THE INVENTION

The present invention relates to a method of measuring the dimensions of an object in several directions, with a light beam being deflected over the object in the direction to be measured and a conclusion being drawn from the duration of the interruption of the light beam by the object as to the dimensions of the latter. Methods and apparatuses of this type are known in which the optical system is configured in such a way that a telecentric light beam at a known velocity or, more precisely, with a known velocity curve, is deflected through the measuring field so that the duration and position of the interruption of the light beam permit a precise conclusion as to the dimensions and possibly the position of the object.

In order to detect the dimensions of an object in several directions, generally in two directions (x, y) that are disposed at a right angle to one another, the light beam deflected by a deflection member, for example a rotating or oscillating mirror, is conducted through an objective lens which produces a telecentric light beam and to a beam divider from which two light beams travel simultaneously over suitable mirror systems into the measuring field where they are deflected in synchronism in two mutually perpendicular directions. Although this arrangement requires only one light source and one objective lens, it is connected with considerable drawbacks. The division of the light beam into two light beams and their introduction into the measuring field by way of mirror systems does not permit the measuring device to have a compact structure. It is difficult and expensive to configure and set the optical system so that the two light beams created from one light beam that passes through a common objective lens are focused in an optimum manner. A very precise measurement of even the smallest dimensions, however, requires very precise focusing of the light beams at the location of the object. The common objective lens disposed upstream of the beam divider and the mirror systems is relatively far removed from the object and also from windows in the housing of the measuring instrument through which the light beams enter the measuring field. When passing through the windows, the light beams focused onto the object already have a relatively small cross section so that impurities possibly present on these windows could, under certain circumstances, have a considerable, interfering influence on the light beams. As mentioned, the two light beams pass through the measuring field in synchronism, that is, the measurement signals corresponding to this passage of light occur practically in synchronism and must be processed in separate measuring channels.

SUMMARY OF THE INVENTION

It is the object of the present invention to avoid one or several of the above-mentioned drawbacks. This is accomplished in that a light beam for each direction is conducted through a separate objective lens. In that case, the objective lens can be disposed as closely as possible to the object or in the immediate vicinity of a housing window where the light beam still has a considerable cross section and can hardly be influenced by impurities.

Preferably, the two light beams, which may originate from separate sources, may already be conducted separately over a movable deflection member, thus eliminating the beam divider. It is then also possible to individually optimally set the entire optical system for each individual light beam and thus to provide for the optimum accurate focus at the location of the object which permits the measuring accuracy to be increased considerably. At the same time, a compact structure results.

The deflection of the light beams may be effected staggered in time in such a way that the respective measurements in different directions also take place staggered in time so that the measuring signals can be processed in a single measuring channel.

Further details and advantages will become evident from the description below of an embodiment of the measuring device according to the invention.

DETAILED DESCRIPTION OF THE PREFERRED EMBODIMENT

Figure 1:
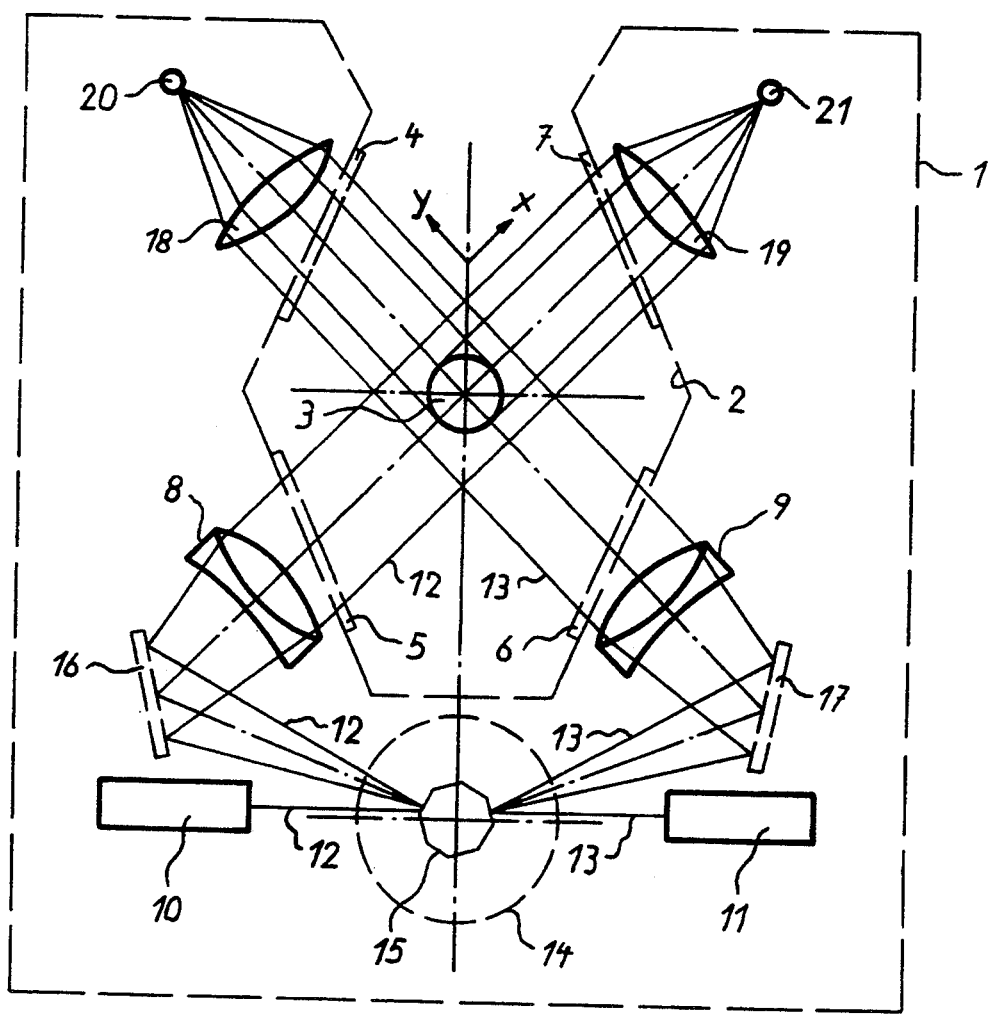
FIG. 1 is a schematic representation of the measuring device.

FIG. 1 shows a housing 1 of the measuring instrument in which the measuring members are disposed. The measuring housing has a passage 2 which has an approximately trapezoidal cross section through which a measuring object 3, for example a wire, a cable, an optical conductor or some other continuous product can be conducted. Correspondingly, however, stationary objects can also be measured. In passage 2, the housing has four windows 4 to 7 through which light beams are able to pass through the measuring field through pairs of oppositely disposed windows as indicated in FIG. 1. An objective lens 8 and 9, respectively, is disposed directly downstream of the lower measuring windows 5 and 6. The device includes two laser sources, preferably semiconductor lasers, 10 and 11, each including a non-illustrated collimator, which throws a light beam 12 and 13, respectively, onto an octagonal mirror 15 driven by a motor 14. From this mirror the light beams are directed through stationary mirrors 16 and 17, respectively, to objective lenses 8 and 9, respectively, in which the light beam, that is deflected practically in a point in mirror 15, is broken up into a telecentric light beam, that is, a light beam that is always parallel to itself. In the measuring field, light beams 12 and 13 are perpendicular to one another so that the dimensions of object 3 can be detected in two coordinate directions x and y. Downstream of windows 4 and 7 there is in each case a focusing lens system 18 and 19, respectively, which throws the incident light beam onto a photoelectric transducer 20 or 21, respectively. Transducers 20 and 21 are connected with a common input of a non-illustrated electronic measuring unit which, in a manner to be described below, processes the incoming measurement signals.

The basic mode of operation of the device according to FIG. 1 is essentially evident from the above. Rotation of mirror 15 causes laser beams 12 and 13 to be periodically deflected to pass through the measuring field. From the duration during which the light beams are interrupted by object 3 in the two directions x and y, a conclusion can be drawn as to the dimensions of the object in the two directions. Thanks to the separate guidance of the light beams from separate light sources having their own collimators through mirror 15 and objective lenses 8 and 9, it is possible to independently set the two optical systems in an optimum manner. This results in a high precision focus of the laser beams at the location of object 3, and it has been found that in a practical embodiment, dimensions of 80 μm to 32 mm could be measured with sufficient precision with one and the same device.

Figure 2:
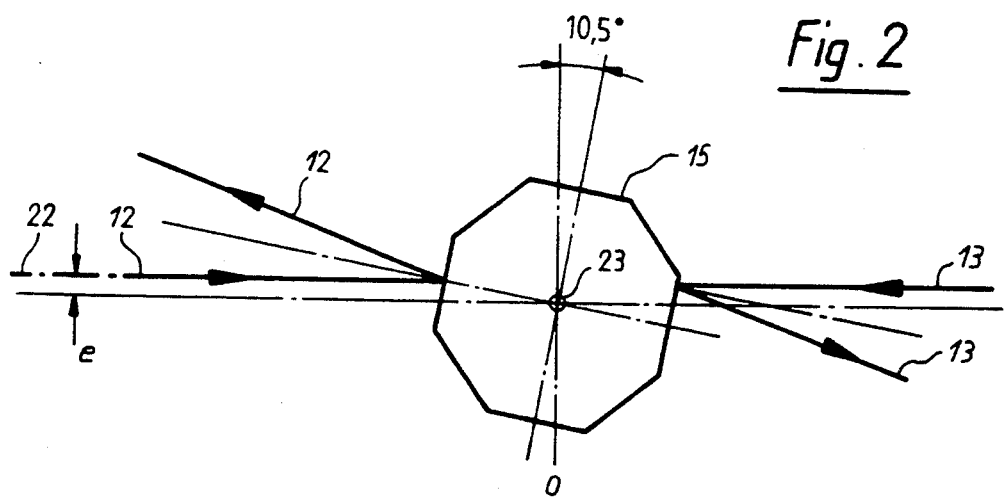
FIG. 2 depicts a first position of the deflecting mirror.
Figure 3:
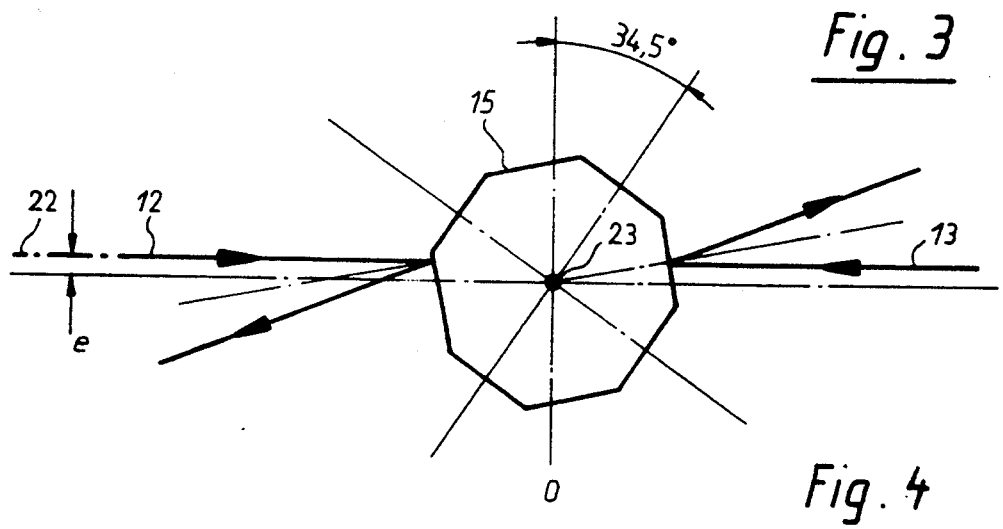
FIG. 3 depicts a further position of the deflecting mirror.
Figure 4:
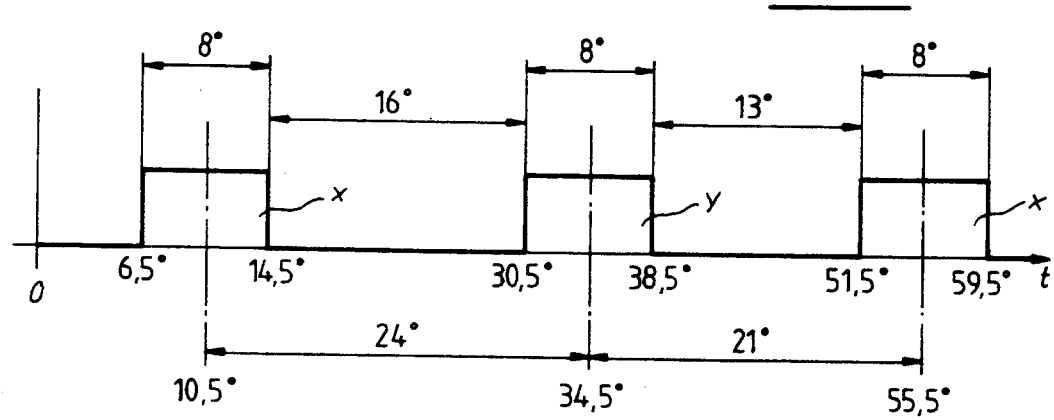
FIG. 4 depicts the time sequence of the successive passage of the light beams through the measuring field.

FIG. 1 already shows that the two laser beams 12 and 13 from sources 10 and 11 impinge on mirror 15 from opposite sides in a common axis, but with a certain eccentricity with respect to the rotation axis of the mirror. This situation is shown to an enlarged scale in FIGS. 2 and 3. Accordingly, the optical axis 22 of the two laser beams 12 and 13 has an eccentricity e relative to the rotation axis of octagonal mirror 15. FIG. 2 shows a position of mirror 15 in which laser beam 12 is reflected upward into the measuring field by way of mirror 16 and objective lens 8, while laser beam 13 is reflected downward and is ineffective. Let it be assumed that the position according to FIG. 2 corresponds to rotation of mirror 15 by 10.5° from its zero position; the angle between the incident beams and the exiting beams 12 and 13 would then be 21°. The reverse situation results from FIG. 3 for a rotation angle of 34.5° for mirror 15 out its zero position; that is, laser beam 13 is now directed into the measuring field via mirror 17 and objective lens 9, while laser beam 12 is ineffective. Let it be assumed that the beam passage into the measuring field is always limited symmetrically to 8° relative to the angle bisector indicated in FIGS. 2 and 3 for the incident and exiting beams. These conditions are shown in FIG. 4 where it is assumed that no object is disposed in the measuring instrument. Thus light pulses or, more precisely, output pulses from transducers 20 and 21, occur during a rotation angle of 8° in each case, with these pulses lying symmetrically to positions at 10.5°, 34.5.° and 55.5°. As is evident from FIG. 4, these pulses, due to eccentricity e, now do not occur at regular intervals; instead, the spacing between each pair of successive pulses is 24° while the distance to the next pulse is only 21°. Correspondingly, the pulse intervals are 16° and 13°, respectively. The following advantages result from this situation: thanks to the time interval between a measuring pulse for dimension x and a measuring pulse for dimension y, a single electronic evaluation system can be employed. Since, moreover, the time intervals between two successive measuring pulses of one group (x, y) of measuring pulses and the first pulse (x) of the next group are different, a simple logic unit is sufficient to feed the values for x and y calculated in the common measuring channel to respective displays or to the respective evaluation or control circuits.

Figure 1A:
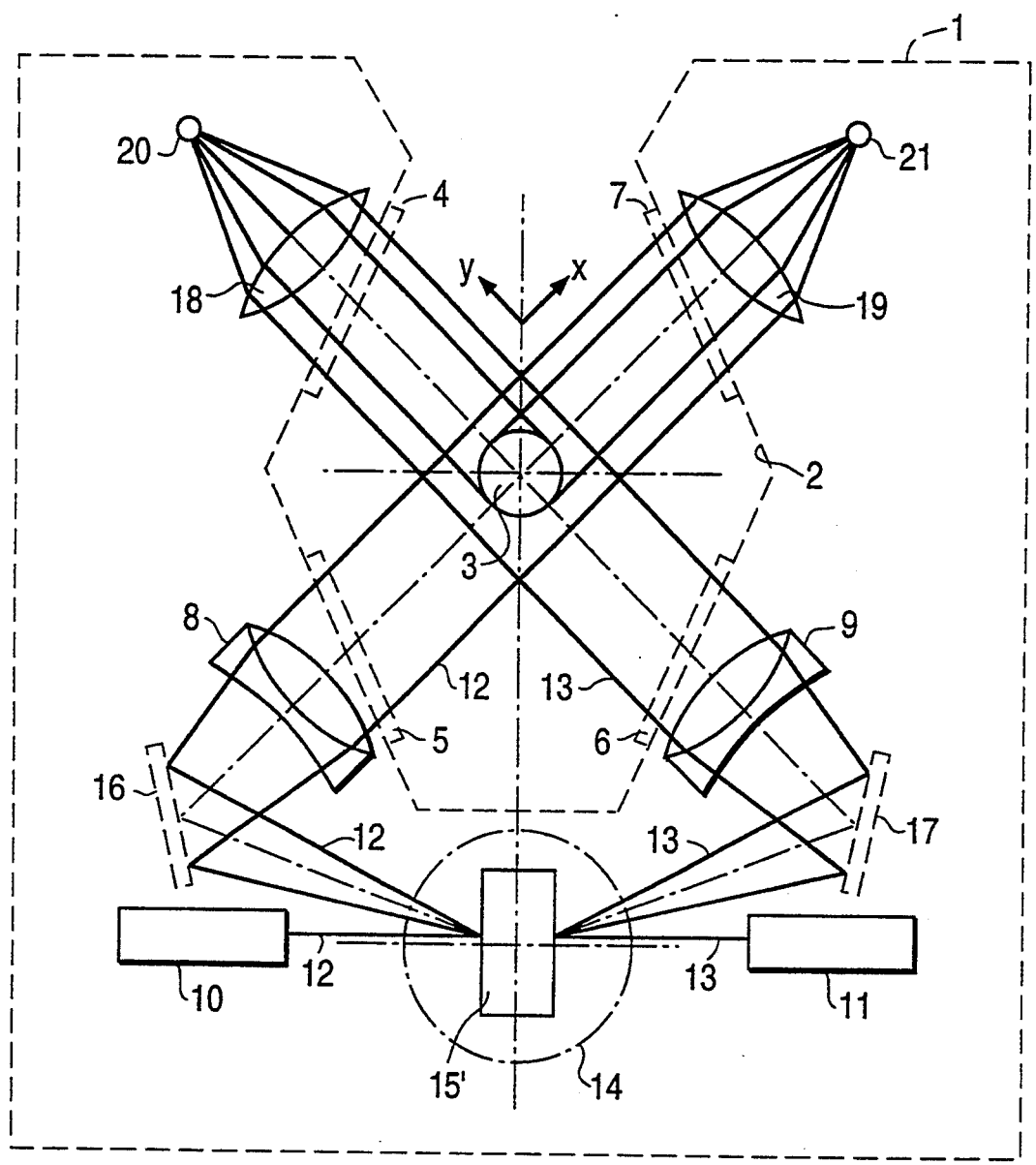
FIG. 1A is a modification of the device of FIG. 1 provided with a two-sided oscillating mirror for the deflecting mirror.

While the illustrated embodiment corresponds to the most frequent application, namely the measurement in two coordinate directions, measurements in three dimensions are also possible, in principle. Instead of a rotating, polygonal deflection mirror 15, an oscillating mirror 15' (as shown in FIG. 1A) could be provided which is reflective on both sides and alternatingly deflects the two laser beams 12 and 13 onto mirrors 16 and 17, respectively.

It will be understood that the above description of the present invention is susceptible to various modifications, changes and adaptations, and the same are intended to be comprehended within the meaning and range of equivalents of the appended claims.

What is claimed is:

1. A method of measuring the dimensions of an object in two orthogonal directions, the method comprising:
   providing a first light beam by means of a first light source;
   providing a second light beam by means of a second light source;
   deflecting the first light beam over the object in a first one of the two orthogonal directions to be measured through a first objective lens; and
   deflecting the second light beam over the object in a second one of the two orthogonal directions to be measured through a second objective lens;
   wherein respective measuring signals are produced for determining the dimensions of the object based on the duration of the interruption of the respective light beams by the objects.

2. A method according to claim 1, wherein each of the respective first and second light beams is deflected over the object by a common deflection member which includes a rotating or oscillating mirror.

3. A method according to claim 1, wherein the deflections of the first and second light beams over the object are offset in time and wherein the respective measuring signals are conducted through a common channel for use in determining the respective dimensions of the object in a time-multiplexed manner.

4. A method according to claim 3, wherein the two orthogonal dimensions of the object are measured in a measuring series, and wherein the time interval between successive measurements of one measuring series in both orthogonal directions is different from the time interval between the last measurement of one series and the first measurement of the next series.

5. A method according to claim 4, wherein the first and second light beams from the first and second light sources are conducted on a common optical axis from opposite sides onto a rotating, polygonal mirror, and wherein the optical axis is eccentric with respect to a rotation axis of the mirror.

6. A measuring device for measuring the dimensions of an object in two orthogonal directions, the device comprising:
   a first light source for providing a first light beam;
   a second light source for providing a second light beam;
   scanning means for deflecting the first and second light beams over the object in a respective one of the two orthogonal directions, respectively; and
   detecting means for detecting the respective light beams and the respective duration of their interruption by the object, and producing respective first and second measuring signals associated therewith;

wherein the scanning means includes first and second respective objective lenses for the first and second light beams associated with a respective one of the measuring directions.

7. A device according to claim 6, wherein the objective lenses are disposed immediately in front of measuring windows through which the respective first and second light beams pass to reach the object.

8. A device according to claim 6, wherein the first and second light sources each comprise a separate semiconductor laser, equipped with a collimator.

9. A device according to claim 8, wherein the scanning means further includes a rotatable or oscillating mirror equipped with two reflecting surfaces, and wherein the first and second light sources are disposed on opposite sides of the mirror.

10. A device according to claim 6, wherein the scanning means further includes means for deflecting the respective first and second light beams over the object offset from each other in time.

11. A device according to claim 10, wherein the detecting means outputs the respective first and second measuring signals offset in time into a single channel for processing in a time-multiplexed manner.

12. An apparatus for measuring two orthogonal dimensions of an object, comprising:
    first and second light sources for producing first and second light beams;
    a rotatable reflector, disposed between the first and second light sources, for alternately deflecting the first and second light beams from the first and second light sources;
    first and second static reflectors, for reflecting the first and second respective light beams deflected by the rotatable reflector;
    first and second objective lenses each disposed to receive a respective one of the deflected light beams from the rotatable reflector by way of the first and second static reflectors, for collimating the respective light beams so that they are parallel to a respective dimension of the object to be measured;
    first and second focusing lenses disposed on opposite sides of the object with respect to the first and second objective lenses, respectively, for focusing a respective one of the parallel light beams received from a respective one of the first and second objective lenses; and
    first and second photo-detectors each for detecting a respective one of the focused light beams from the focusing lenses, and producing measuring signals into a common channel.

13. The apparatus according to claim 12, wherein the first and second light sources are disposed along a common optical axis on opposite sides of the rotatable reflector, and
    wherein the rotatable reflector comprises a rotatable mirror driven by a motor and having at least two reflecting surfaces, an axis of rotation of the rotatable mirror being offset from the common optical axis.

14. The apparatus according to claim 12, wherein the first and second light sources are disposed along a common optical axis on opposite sides of the rotatable reflector, and
    wherein the rotatable reflector comprises a octagonal rotatable mirror rotated by a motor and having eight reflecting surfaces, an axis of rotation of the rotatable mirror being offset from the common optical axis.

15. A method of measuring the dimensions of an object in a plurality of directions with a light beam being deflected over the object in each one of the directions to be measured and a conclusion as to the dimensions of the object is drawn from the duration of the interruption of the light beam by the object, wherein for each direction, a light beam is conducted through a separate objective lens;
    wherein the light beams are conducted through a common deflection member comprising a rotating or oscillating mirror; and
    wherein the time interval between successive measurements of one measuring series in all directions is selected to be different from the time interval between the last measurement of one series and the first measurement of the next series.

16. A method according to claim 15, wherein the light beams are conducted in one common optical axis from opposite sides onto a rotating, polygonal mirror, with the optical axis being eccentric to the rotation axis of the mirror.

17. A measuring device for measuring the dimensions of an object in a plurality of directions with a light beam being deflected over the object in each one of the directions to be measured and a conclusion as to the dimensions of the object is drawn from the duration of the interruption of the light beam by the object, the device comprising:
    a plurality of light sources, each producing a respective light beam and each equipped with a collimator, for each measuring direction;
    deflection means for deflecting the light beams over the object; and
    detecting means for detecting interruption of a respective one the light beams by the object;
    wherein separate objective lenses are provided for each light beam associated with a measuring direction; and
    wherein the separate light sources are disposed on opposite sides of the deflection means, the deflection means comprising a deflection member equipped with at least two oppositely disposed reflecting surfaces, the deflection member being a rotating or oscillating mirror.

* * * * *